(12) United States Patent
Liu et al.

(10) Patent No.: US 7,803,287 B2
(45) Date of Patent: Sep. 28, 2010

(54) PHOSPHOR MATERIAL OF PHOSPHATE COMPOUND

(75) Inventors: Ru-Shi Liu, Hsinchu County (TW);
Ivan Baginskiy, Hsinchu (TW);
Ting-Shan Chan, Tainan County (TW);
Jenq-Yang Chang, Taipei (TW)

(73) Assignee: National Central University, Taoyuan (TW)

( * ) Notice: Subject to any disclaimer, the term of this patent is extended or adjusted under 35 U.S.C. 154(b) by 270 days.

(21) Appl. No.: 11/802,583

(22) Filed: May 23, 2007

(65) Prior Publication Data

US 2008/0233034 A1 Sep. 25, 2008

(30) Foreign Application Priority Data

Mar. 22, 2007 (TW) ................... 096110013

(51) Int. Cl.
C09K 11/70 (2006.01)
C09K 11/55 (2006.01)
C09K 11/54 (2006.01)

(52) U.S. Cl. .................. 252/301.6 P; 252/301.4 R

(58) Field of Classification Search ........... 252/301.4 P, 252/301.6 P
See application file for complete search history.

(56) References Cited

U.S. PATENT DOCUMENTS

| 6,621,211 | B1 | 9/2003 | Srivastava et al. ........... 313/503 |
| 2001/0055718 | A1* | 12/2001 | Li et al. ..................... 429/221 |
| 2002/0039687 | A1* | 4/2002 | Barker et al. ........... 429/231.95 |
| 2002/0106563 | A1* | 8/2002 | Okawa et al. ............... 429/221 |
| 2002/0124386 | A1* | 9/2002 | Hosoya et al. ............. 29/623.1 |

* cited by examiner

Primary Examiner—C. Melissa Koslow
(74) Attorney, Agent, or Firm—Jackson IPG PLLC; Demian K. Jackson

(57) ABSTRACT

The present invention is a yellow-green phosphor material with a high luminescence intensity. The present invention is suitable for excitation by ultraviolet or blue light. The phosphor material is made of a phosphate compound with a chemical formula of $LiZn_{1-x}PO_4:M_x$ ($0<x<0.2$). The host lattice is $LiZn_{1-x}PO_4$ and the luminescent center is $M_x$, which is a transition metal element. The present invention is easily and fast fabricated for mass production and has a fine color purity and a good thermal stability.

17 Claims, 4 Drawing Sheets

PHOSPHOR MATERIAL OF PHOSPHATE COMPOUND

FIELD OF THE INVENTION

The present invention relates to a phosphor material; more particularly, relates to a yellow-green phosphor material suitable to be excited by ultraviolet and blue light.

DESCRIPTION OF THE RELATED ARTS

A white light is a mixture of colorful lights. A white light perceived by human eyes comprises colorful lights having more than two wavelengths, such as a white light obtained by a blue light added with a complementary yellow light; or by mixing a blue light, a green light and a red light. In human's daily life, no matter a person is in a house or is outside a building, when he/she needs a light, a light like a sun light is always preferred. Hence, light emitting diodes (LED) are developed to be used for generating white lights like the sun light in hope of replacing traditional lighting devices. It is because the LED has a longer life time, a lower power consumption, a smaller size, a faster reaction, etc. Yet the LED still shines not bright enough and has a higher cost. Hence, the LED is still used as an auxiliary light source, like a flashlight, a decoration light, etc. However, it is expected that the LED can completely replace all of the other traditional lighting devices in the future.

Except the problem concerning the brightness, the phosphor powder used is an other key issue to the luminescence efficiency of the LED. Hence, researchers keep working hard on developing a phosphor powder having a better phosphor efficiency. Through years of development, it is found that an ultraviolet (UV) LED is the best light source for future light devices. Nowadays, the UV LED used for generating white light is a LED generating a UV light having a wavelength of 360~400 nanometers (nm) as an excitation source. The UV light excites a plurality of phosphor powders to emit three components of a white light-a blue, a green and a red lights. In the end, the three colorful lights are mixed to obtain the white light. Such a system uses more phosphor powder than an other system which is a blue GaN substrate coordinated with a phosphor powder of yttrium aluminum garnet (YAG). As a result, a few things are considered to obtain a white light with a high efficiency and a good quality, which are a transformation efficiency with the coordination in between; a color temperature of the white light mixed; a color rendering index; and deteriorations for each component and so on. Therefore, it becomes more and more important to develop a phosphor material for excitation with the UV LED to obtain the white light with the high efficiency and the good quality.

In U.S. Pat. No. 6,621,211, it is revealed that a phosphate compound is used as a blue phosphor material, whose formula is $(Sr, Ba, Ca)_5(PO_4)_3Cl:Eu$; a silicate is used as a blue-green phosphor material, whose formula is $(Ba, Sr, Ca)_2SiO_4:Eu$; and the phosphor materials are excited by a UV LED to emit a blue to blue-green light. Through a proper mixture with orange and red phosphor materials, a white light can be obtained through excitation by the UV LED. However, a yellow-green phosphate phosphor material for obtaining a white light through excitation by a UV LED is still in lack. Hence, the prior arts do not fulfill all users' requests on actual use.

SUMMARY OF THE INVENTION

The main purpose of the present invention is to provide a yellow-green phosphor material suitable to be excited by ultraviolet and blue light.

Another purpose of the present invention is to provide a method to fabricate a phosphor material for mass production while the phosphor material has a fine color purity and a good thermal stability.

To achieve the above purposes, the present invention is a phosphor material of a phosphate compound, where the phosphor material is obtained through a synthesis with a first reactant containing Li, a second reactant containing Zn, a third reactant containing $PO_4$ and a fourth reactant containing a metal element; the phosphor material is a mixture having a chemical formula of $LiZn_{1-x}PO_4:M_x$ while x is a value between 0 and 1 and M is at least one transition metal element; and $LiZn_{1-x}PO_4$ is a host lattice and $M_x$ is a luminescent center. Accordingly, a novel phosphor material of a phosphate compound is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing fabricating the present invention according to the present invention;

DESCRIPTION OF THE PREFERRED EMBODIMENT

The following description of the preferred embodiment is provided to understand the features and the structures of the present invention.

Figure 1:
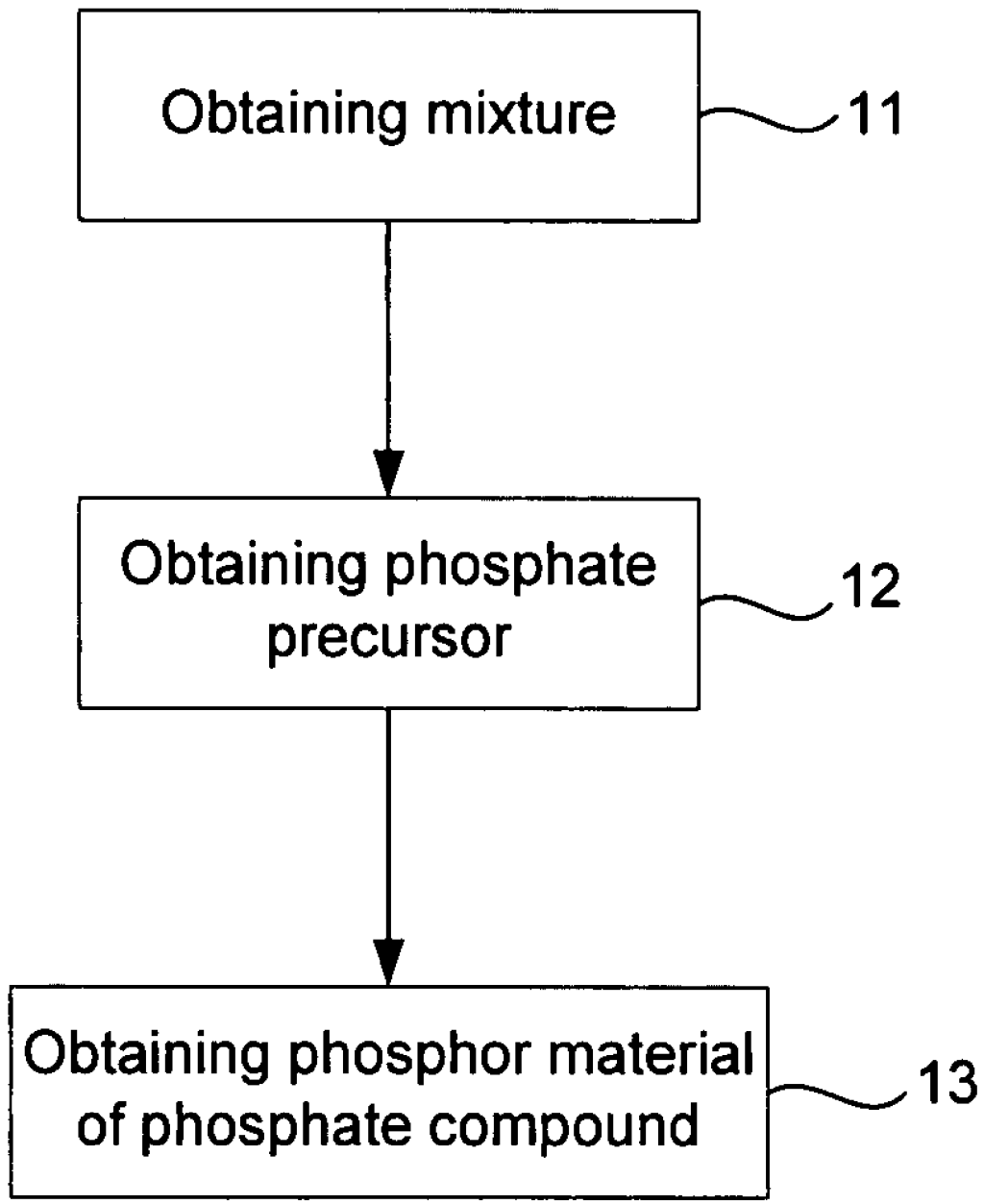

Please refer to FIG. 1, which is a flow view showing fabricating the present invention according to the present invention. As shown in the figure, the present invention is a phosphor material of a phosphate compound. The phosphor material is a mixture, whose chemical formula is $LiZn_{1-x}PO_4:M_x$ while x is a value between 0 and 1 and M is a metal element. The phosphor material has a fabricating method, comprising the following steps:

(a) Obtaining a mixture 11: According to stoichiometry, a mixture is obtained through a synthesis with a first reactant containing Li, a second reactant containing Zn, a third reactant containing $PO_4$ and a fourth reactant containing a metal element, where the synthesis is a solid state reaction or a chemical synthesis. And, furthermore, the solid state reaction can be a citrate gel method and the chemical synthesis can be a spray pyrolysis. Therein, the first reactant is $Li_3PO_4$, $LiH_2PO_4$, $LiNO_3$ or $Li_2CO_3$; the second reactant is ZnO, $Zn(NO_3)_2$, $ZnCO_3$, or Zn directly oxidized; the third reactant is $(NH_4)_2HPO_4$ or $LiH_2PO_4$; and the fourth reactant is a compound containing a metal element.

(b) Obtaining a phosphate precursor 12: The mixture is fully ground and is put into an argon atmosphere to be heated at a temperature between 800 and 1000 Celsius degrees (° C.) for 4 to 8 hours (hr) and then is cooled down to a room temperature to obtain a phosphate precursor. Then, the phosphate precursor is ground. Therein, the argon atmosphere is added with hydrogen or pure air during the fabrication.

(c) Obtaining a phosphor material of a phosphate compound 13: Finally, the phosphate precursor is put into a reduction atmosphere to be heated at a temperature between 750 and 950° C. for 4 to 8 hr and then is cooled down to a room temperature. Thus, a phosphor material of a phosphate compound is obtained, whose chemical formula is $LiZn_{1-x}PO_4$:$M_x$ with a host lattice of $LiZn_{1-x}PO_4$ and a luminescent center of M. Therein, x is a value between 0 and 1 (preferably $0<x\leqq0.04$); M is at least one transition metal element of V, Cr, Mn, Fe, Cu, Nb, Mo, Ru, Ag, Ta, W, Os, Ir, Pt or Au; and, the reduction atmosphere is added with hydrogen or nitrogen during the fabrication.

When fabricating the present invention, for example, the followings are obtained: a first reactant containing Li, like $Li_3PO_4$; a second reactant containing Zn, like ZnO; a third reactant containing $PO_4$, like $(NH_4)_2HPO_4$; and a fourth reactant containing Mn, like $MnCO_3$. The above reactants are synthesized through a solid state reaction of a citrate gel method or a chemical synthesis of a spray pyrolysis to obtain a mixture of $LiZn_{1-x}PO_4$:$Mn_x$, where x is 0.04. The fourth reactant can further be an oxide of Mn, like MnO, $Mn_2O_3$ or $MnO_2$; a nitrate of Mn, like $Mn(NO_3)_2$; or Mn directly oxidized.

The mixture is then fully ground in a mortar and is put in an alumina crucible to be located in a square burner. In an argon atmosphere of a square burner, the ground mixture is heated at an ascending ratio of 2° C. per minute (° C./min) to reach 900° C. and is stayed at the temperature for 6 hr. The temperature is then cooled down to a room temperature at a ratio of 5° C./m in to move out the heated and cooled mixture to be ground.

The ground powder is put in an other alumina crucible and is located in a reduction atmosphere to be added with hydrogen and nitrogen having a rate of 25 percents (%) to 75%. The powder is then heated at a ratio of 4° C./min to reach 850° C. for a reduction. After being stayed at the temperature for 6 hr, the temperature is cooled down to a room temperature at a ratio of 5° C./min and the material obtained after the reduction, whose chemical formula is $LiZn_{0.96}PO_4$:$Mn_{0.04}$, is ground into powder. Thus, a novel phosphor material of a phosphate compound is obtained.

Figure 2:
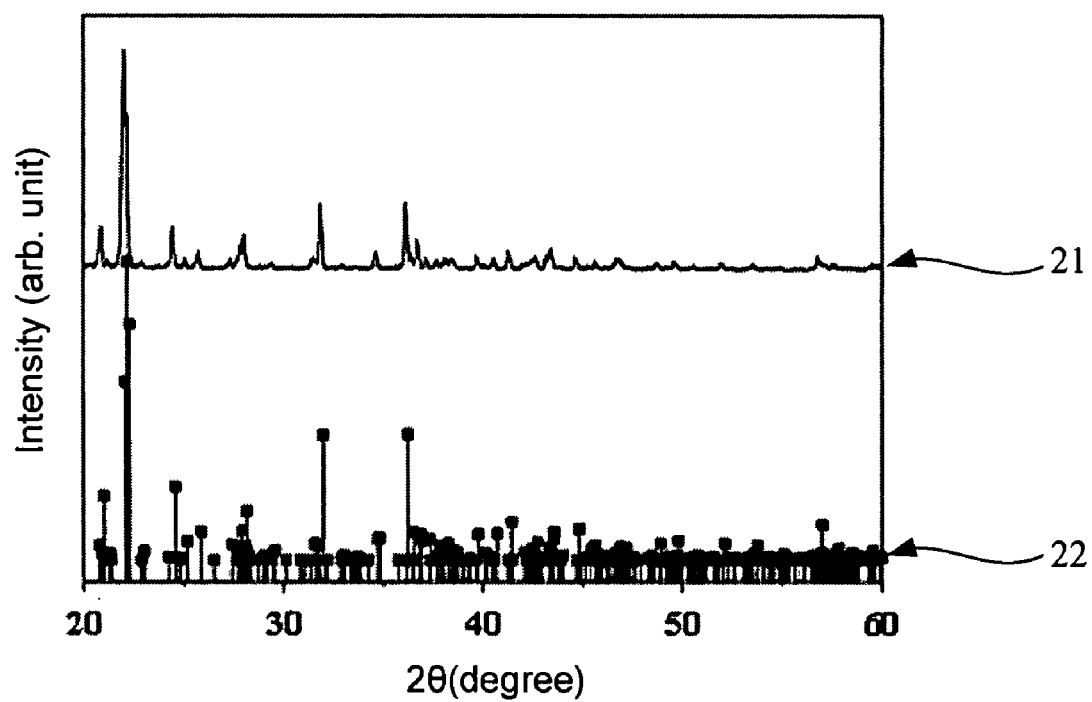
FIG. 2 is the view showing the X-ray powder diffraction diagram.

Please refer to FIG. 2, which is a view showing an X-ray powder diffraction diagram. As shown in the figure, an X-ray powder diffraction diagram 21 of the present invention $LiZn_{1-x}PO_4$:$Mn_x$, having x as 0.04, is obtained through an X-ray powder diffractometer. The diagram 21 is compared with an X-ray powder diffraction diagram 22 of a standard lithium zinc phosphate compound (ICSD no: 203174) to identify its purity in crystal structure. As shown in the figure, the phosphor material of the phosphate compound according to the present invention has a single monoclinic structure with crystal lattice parameters of 'a' as 17.266 angstroms (Å), 'b' as 9.738 Å, 'c' as 17.092 Å, '$\alpha$' as an angle of 90 degrees (°), '$\beta$' as an angle of 111.03°, and '$\gamma$' as the same angle degrees as '$\alpha$'.

Figure 3:
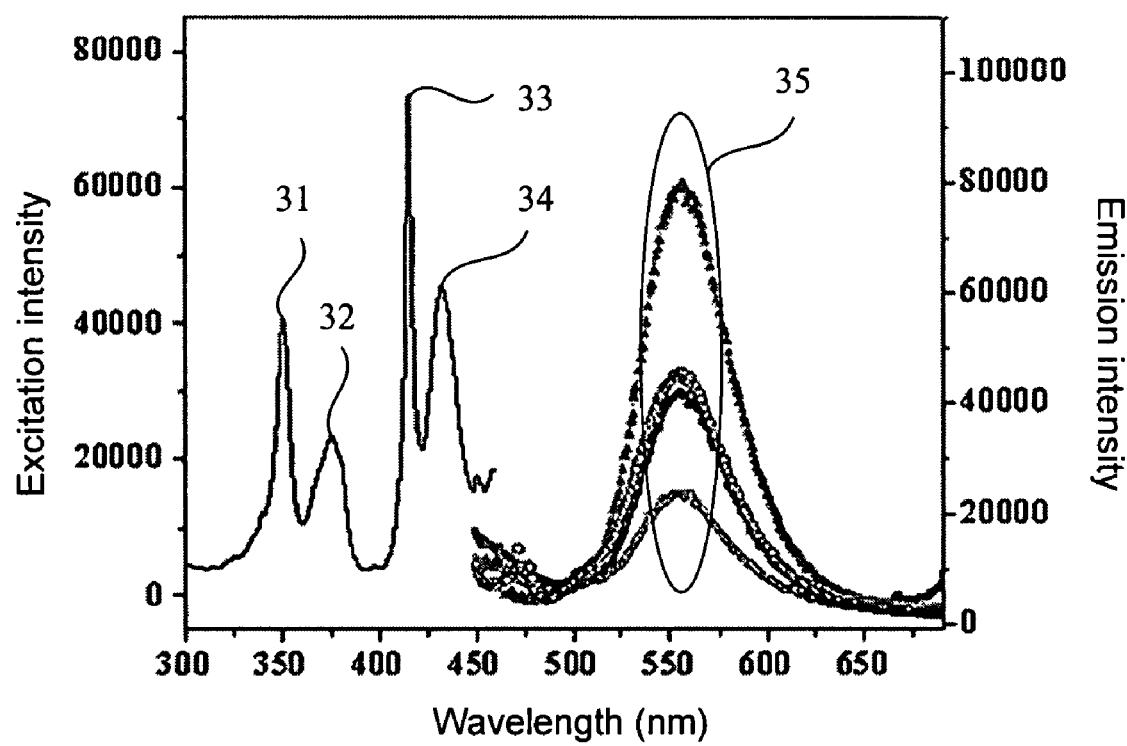
FIG. 3 is the view showing the spectrum of the light excitation and the light emission.
Figure 4:
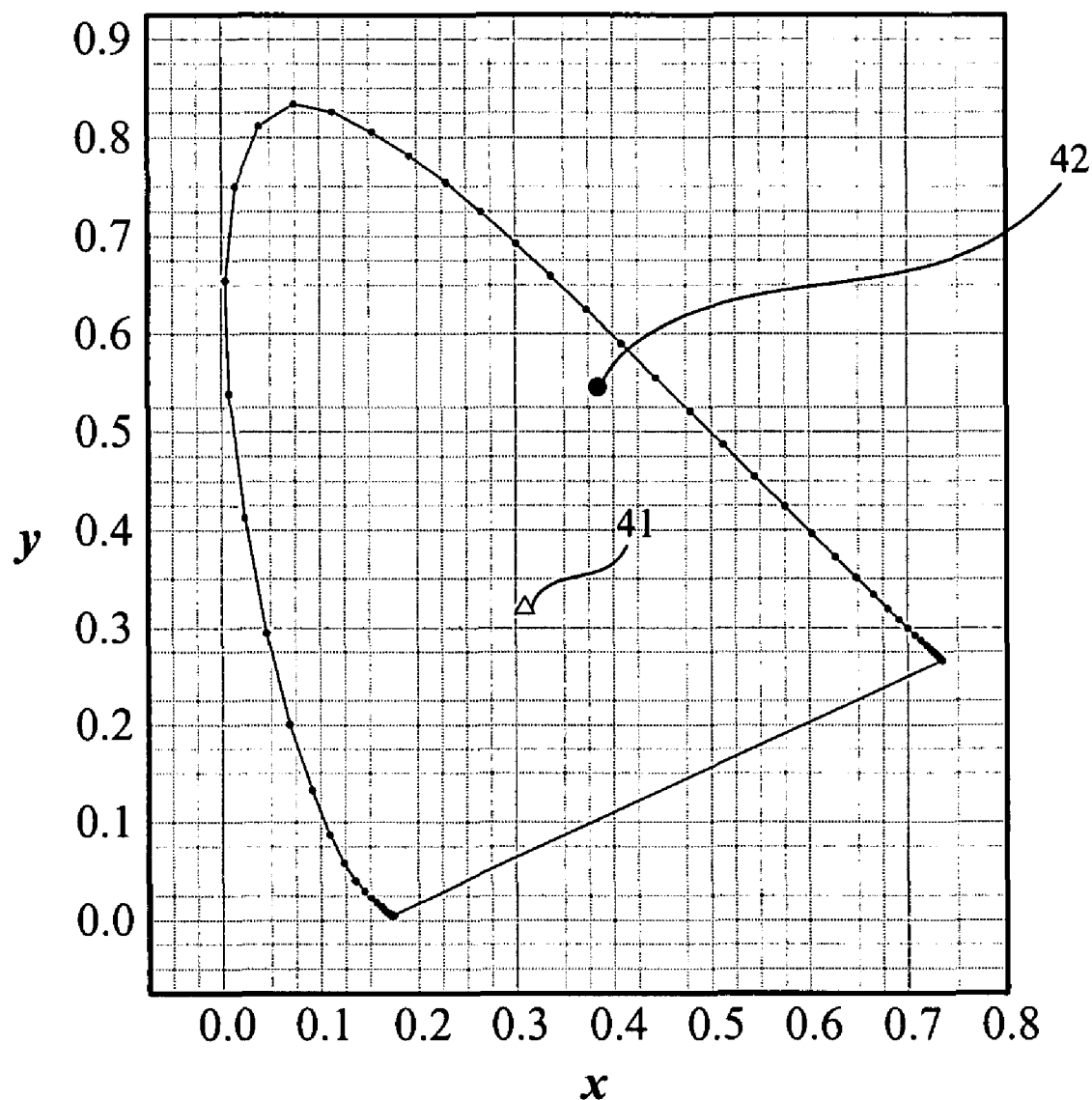
FIG. 4 is the view showing the transformed CIE chromatic coordinates for the light emission spectrum.

Please refer to FIG. 3 and FIG. 4, which are a view showing a spectrum of light excitation and light emission; and a view showing transformed CIE chromatic coordinates for the light emission spectrum. As shown in the figures, the phosphor material of $LiZn_{1-x}PO_4$:$Mn_x$ according to the present invention is suitable to be excited by ultraviolet or blue light. And the wavelength of a light obtained through excitation by an exciting source of a light emitting diode (LED) or a plasma is between 350 and 450 nanometers (nm), which is a wide band excitation. Besides, among wavelengths for exciting at 351 nm 31, 375 nm 32, 415 nm 33 and 432 nm 34, the wavelengths for exciting at 415 nm 33 has the best luminous intensity output; and the highest luminous intensity for all wavelengths for exciting is around 556 nm 35. In one preferred embodiment, the phosphor material is excited to emit a yellow-green light having a wavelength between 350 and 450 nanometers. Hence, the present invention is a yellow-green phosphor material.

Emission spectrum data of the phosphor material of $LiZn_{1-x}PO_4$:$Mn_x$ fabricated according to the present invention is translated into chromatic coordinates according to a formula for chromatic coordinates on a chromaticity diagram by Commission International de l'Eclairage (CIE) in 1931. As shown in FIG. 4, a theoretical chromatic coordinates for white light 41 is (0.31, 0.32). The simulated chromatic coordinates 42 for the luminescence by the phosphor material of the present invention is located in a yellow-green luminescence area. Thus, it shows that the present invention is a yellow-green phosphor material with good color purity.

To sum up, the present invention is a phosphor material of a phosphate compound, where the phosphor material is a yellow-green phosphor material suitable to be excited by an ultraviolet or a blue light; the phosphor material has a fast and easy fabricating method for a mass production; and the phosphor material has a fine color purity and a good thermal stability.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A phosphor material of a phosphate compound, said phosphor material being a mixture, said mixture having a chemical formula of $LiZn_{1-x}PO_4$:$Mn_x$, wherein said x is a value between 0 and up to and including 0.04, wherein said phosphor material is a luminescent phosphor material.

2. The phosphor material according to claim 1, wherein said Mn is obtained from a compound selected from a group consisting of an oxide of Mn, a carbonate of Mn, a nitrate of Mn, and Mn directly oxidized.

3. The phosphor material according to claim 2, wherein said Mn is obtained from said oxide of Mn selected from a group consisting of MnO, $Mn_2O_3$ and $MnO_2$.

4. The phosphor material according to claim 2, wherein said Mn is obtained from said carbonate of Mn and said carbonate of Mn is $MnCO_3$.

5. The phosphor material according to claim 2, wherein said Mn is obtained from said nitrate of Mn and said nitrate of Mn is $Mn(NO_3)_2$.

6. The phosphor material according to claim 1, wherein said phosphor material is excited to emit a yellow-green light having a wavelength between 350 and 450 nanometers.

7. The phosphor material according to claim 1, wherein said phosphor material is excited by a source selected from a group consisting of a light emitting diode (LED) and a plasma.

8. The phosphor material according to claim 1, wherein said phosphor material of said phosphate compound has a fabricating method, comprising steps of:
   (a) obtaining a first reactant containing Li, a second reactant containing Zn, a third reactant containing $PO_4$ and a fourth reactant containing Mn to obtain a mixture through a synthesis;
   (b) locating said mixture in an argon atmosphere to be heated to obtain a phosphate precursor; and
   (c) locating said precursor of said phosphate in a reduction atmosphere to be heated to obtain said phosphor material of said phosphate compound.

9. The phosphor material according to claim 8, wherein said first reactant is selected from a group consisting of $Li_3PO_4$, $LiH_2PO_4$, $LiNO_3$ and $Li_2CO_3$.

10. The phosphor material according to claim 8, wherein said second reactant is selected from a group consisting of ZnO, $Zn(NO_3)_2$, $ZnCO_3$, and Zn directly oxidized.

11. The phosphor material according to claim 8, wherein said third reactant is selected from a group consisting of $(NH_4)_2HPO_4$ and $LiH_2PO_4$.

12. The phosphor material according to claim 8, wherein said fourth reactant is a compound containing said Mn.

13. The phosphor material according to claim 8, wherein said synthesis is a citrate gel method.

14. The phosphor material according to claim 8, wherein said synthesis is a spray pyrolysis.

15. The phosphor material according to claim 8, wherein said argon atmosphere is added with a gas to be heated at a temperature between 800 and 1000 Celsius degrees (° C.) for 4 to 8 hours (hr) and then is cooled down to a room temperature; and
   wherein said gas is selected from a group consisting of hydrogen and pure air.

16. The phosphor material according to claim 8, wherein said reduction atmosphere is added with a gas to be heated at a temperature between 750 and 950° C. for 4 to 8hr and then is cooled down to a room temperature; and
   wherein said gas is selected from a group consisting of hydrogen and nitrogen.

17. The phosphor material according to claim 1, wherein x is 0.04.

* * * * *